March 19, 1957     HENRI-GEORGES DOLL     2,786,178
APPARATUS FOR ELECTRICAL WELL LOGGING Filed Dec. 19, 1951     2 Sheets-Sheet 1

INVENTOR.
HENRI-GEORGES DOLL
BY
HIS ATTORNEYS.

United States Patent Office 2,786,178
Patented Mar. 19, 1957

2,786,178

APPARATUS FOR ELECTRICAL WELL LOGGING

Henri-Georges Doll, Ridgefield, Conn., assignor to Schlumberger Well Surveying Corporation, Houston, Tex., a corporation of Delaware Application December 19, 1951, Serial No. 262,466

14 Claims. (Cl. 324—1)

This invention relates to methods and apparatus for electrical well logging, and, more particularly, to novel methods and apparatus for obtaining from within a borehole electrical measurements indicative of formation resistivity in different directions.

It is common practice to obtain indications of the resistivity of formations traversed by a borehole. Generally, a plurality of electrodes are vertically disposed along the borehole, current being emitted from at least one of the electrodes and potential measurements being taken at other predeterminedly spaced electrodes. The whole array of electrodes is raised through the borehole, and an electrical log of the resistivity, among other factors, is recorded as a function of depth. Such measurements are indicative of the apparent vertical resistivities of the formations traversed by the borehole, that is, of the apparent resistivities in a direction parallel to the borehole axis.

It has been found, however, that different geological formations may have substantially equal apparent vertical resistivities. In this case, the location of boundaries of layers of such formations by resistivity measurements alone is difficult. On the other hand, these formations may have different apparent resistivities in a direction other than the vertical; for example, in a horizontal direction. If this factor is measured, such boundaries can more readily be distinguished. Further, if such horizontal measurements are obtained and compared with the apparent vertical resistivities of the same formations, it is possible to determine what is known as the anisotropy coefficient for the particular formations under consideration. The anisotropy coefficient is given by the ratio of the apparent horizontal resistivity to the apparent vertical resistivity and may aid in distinguishing, for example, formations of thin beds whose apparent vertical resistivites are substantially equal. This coefficient also constitutes a significant electrical characteristic of formations.

Prior electrical logging systems all measure the apparent resistivity by means of a vertical array of borehole electrodes. With conventional logging apparatus it would be virtually impossible to arrange the borehole electrodes in a horizontal array in order to obtain an indication of the apparent horizontal resistivity, since the electrodes would have to be so closely spaced, due to the small diameter of the borehole, that the short-circuiting effect of the mud column would render any readings obtained substantially meaningless.

It is an object of the present invention, accordingly, to provide methods and apparatus for measuring the apparent resistivity of formations in directions other than vertical to obtain resistivity curves from which boundaries of various formations may be more readily distinguished.

More specifically, an object of the invention is to provide improved methods and apparatus for measuring the apparent resistivity of formations in a horizontal direction.

A further object of the invention is to provide improved methods and apparatus for determining the anisotropy coefficient of formations traversed by a borehole.

According to the invention, electrical resistivity measurements of a formation may be made in a plurality of directions, preferably simultaneously. In a preferred embodiment two measurements are made: one horizontal or perpendicular to the axis of the borehole and one vertical or parallel with respect to said axis. In the case where the formation beddings are level, these two measurements indicate the apparent resistivity of the formation in a horizontal direction and in a vertical direction, respectively.

These measurements are accomplished by the use of electrodes disposed in an insulated support and urged against the wall of the borehole. Electrode systems of this type which measure the apparent vertical resistivity are shown and described in applicant's copending applications Serial No. 122,102, filed October 18, 1949, and entitled "Resistivity Method and Apparatus for Obtaining Indications of Permeable Formations Traversed by a Bore Hole," now Patent No. 2,669,690, and Serial No. 214,273, filed March 7, 1951, and entitled "Electrical Logging of Earth Formations Traversed by a Bore Hole," now Patent No. 2,712,629. In accordance with the present invention a horizontal insulated electrode array is urged against the borehole wall, taking advantage of the principles described in the above-mentioned copending applications to permit measurement of the horizontal resistivity of the surrounding formation.

In order that the invention may be more clearly understood, it will now be described in detail with reference to the accompanying drawings wherein.

One method of measuring the apparent horizontal resistivity of the formations traversed by a borehole is effected by urging closely spaced insulated electrodes, arranged in a horizontal array, against the borehole wall. This may be accomplished, for example, by the apparatus shown in Figs. 1 and 1A, which also includes means for obtaining the apparent vertical resistivity simultaneously. It is, of course, to be understood that only horizontal electrodes are necessary for measuring the apparent horizontal resistivity alone.

Figure 1:
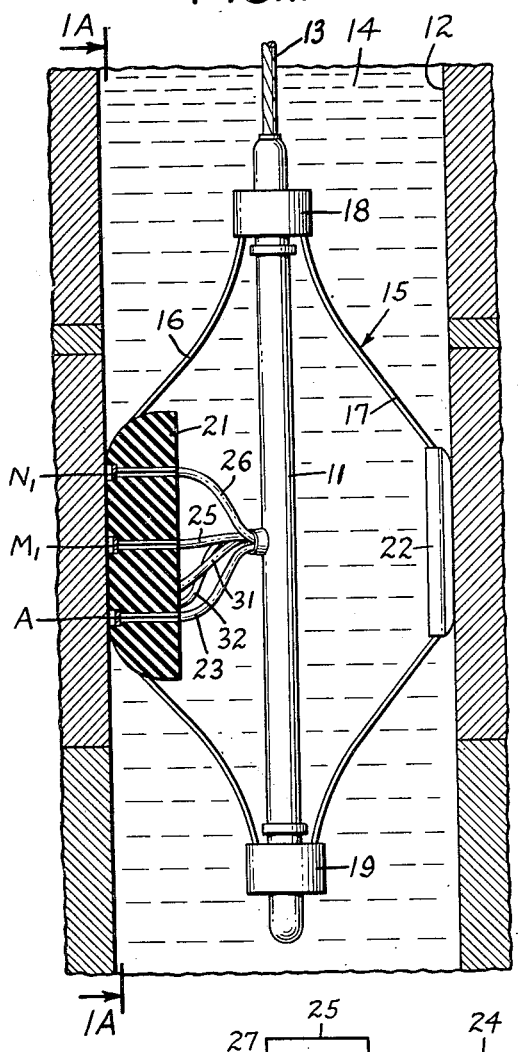
Fig. 1 illustrates, partly in section, an electrode assembly constructed according to the present invention for use in electrical logging operations in wells.
Figure 1A:
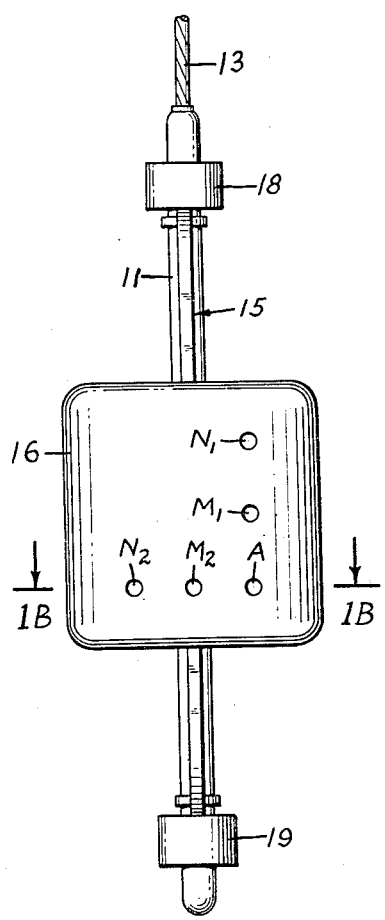
Fig. 1A is a front view in elevation of the electrode assembly of Fig. 1 taken along the line 1A—1A and looking in the direction indicated by the arrows.

As shown in Figs. 1 and 1A the well logging apparatus may comprise a tubular support 11 which is adapted to be lowered into a borehole 12 on a supporting cable 13 which may be wound or unwound on a winch (not shown) located at the surface of the earth. The borehole 12 usually contains a column of more or less electrically conductive liquid 14.

Mounted on the tubular support 11 is a spring cage assembly 15 comprising oppositely bowed springs 16 and 17 having adjacent upper and lower ends secured to collars 18 and 19, respectively, slidable on the support 11. The bowed spring 16 carries at its central portion a pad 21 of electrically insulating material which is urged against the side of the borehole 12 by action of the spring 16. The bowed spring 17 presses a back-up pad 22 against the wall of the borehole 12 opposite the pad 21 for the purpose of keeping the support 11 centralized. Imbedded in the pad 21 are a central electrode A and two vertically spaced electrodes $M_1$ and $N_1$. Also imbedded in the pad are two horizontal electrodes $M_2$ and $N_2$ as clearly shown in Fig. 1A.

Figure 1B:
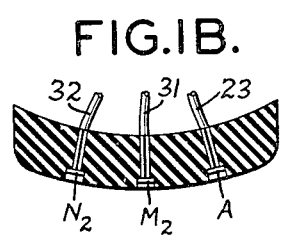
Fig. 1B is a transverse sectional view of a detail of the electrode assembly taken along the line 1B—1B of Fig. 1A and looking in the direction indicated by the arrows.

While a spring cage assembly and square pad have been shown, any convenient means for pressing the electrodes against the side of the borehole may be employed and the pad may be made of any desired shape. Such an arrangement insulates the electrodes from the surrounding mud column, as explained in detail in the above-mentioned copending application Serial No. 122,-102. It is to be understood, of course, that the front surface of the pad 21 is slightly cylindrically curved as shown in Fig. 1B in order that it may conform to and fit snugly against the cylindrically shaped wall of the borehole.

Figure 2:
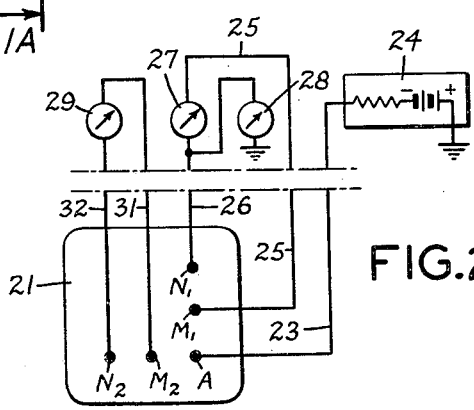
Fig. 2 is a schematic diagram of an electrical logging system embodying the electrode assembly of Figs. 1, 1A and 1B.

Referring now to Fig. 2, it is seen that electrode A is connected through an insulated conductor 23 to one terminal of a current source 24, preferably of constant intensity, the other terminal of which is grounded, for example, at the surface of the earth. The vertical electrodes $M_1$ and $N_1$ are connected through insulated conductors 25 and 26 to the terminals of a high impedance potential recording instrument 27 which indicates the apparent vertical resistivity at one depth of investigation. Indications of the apparent vertical resistivity at a greater depth of investigation may be obtained by connecting vertical electrode $N_1$ to one terminal of another high impedance potential recording instrument 28, the other terminal of which is grounded, for example, at the surface of the earth.

In accordance with the present invention, a set of horizontally spaced apart electrodes $M_2$ and $N_2$ and a further high impedance potential recording instrument 29 connected thereto through insulated leads 31 and 32 are provided to measure simultaneously the apparent horizontal resistivity in substantially the same manner as the electrodes $M_1$, $N_1$ and the instrument 27 measure the apparent vertical resistivity.

In operation, current is emitted through electrode A into the opposite formation. As mentioned in connection with Fig. 1 the pad 21 prevents electrical shunting of the electrodes by the surrounding mud column 14. Vertical potential gradients within the formations are detected by electrodes $M_1$ and $N_1$ and recorded by the instrument 27. Horizontal potential gradients within the formations are detected by the electrodes $M_2$ and $N_2$ and recorded by the instrument 29.

The electrodes A, $M_1$, $N_1$ and the recording instrument 27 constitute a three-electrode system which records a log representative of the apparent vertical electrical resistivities of formations contacted by the pad 21 as it is raised through the borehole. Electrodes A, $N_1$ and the recording instrument 28 constitute a two-electrode system which samples the apparent vertical resistivity to a greater depth than the log obtained by the instrument 27. The electrodes A, $M_2$, $N_2$ and the recording instrument 29 also constitute a three-electrode system which records a log of the apparent horizontal resistivity of the formations.

The logs obtained from the instruments 27 and 29 permit computation or indication of the anisotropy coefficient of the particular formation under investigation at various depths. It is to be recalled that the anisotropy coefficient is defined as the ratio of apparent horizontal resistivity to the apparent vertical resistivity.

It should be understood that a two-electrode system might be used for measuring the apparent horizontal resistivities of the formations instead of the three-electrode system illustrated. In this event, the apparent horizontal resistivity would be compared with the vertical log obtained from the recording instrument 28. In the following embodiments it should be kept in mind that any of the known electrode arrangements may be used as long as similar systems are employed for both the vertical and horizontal resistivity measurements.

Since the vertical resistivity log is normally recorded as a matter of routine in well logging, the horizontal resistivity log may be recorded simultaneously on the same film, thus providing additional information as to the anisotropy coefficient without loss of time or excessive additional equipment.

Where an appreciable mud cake has formed on the borehole wall such as opposite permeable formations, improved results can be obtained if the pad 21 is arranged to cut through a substantial portion of such mud cake and is pressed as closely as possible against the borehole wall.

Figure 3:
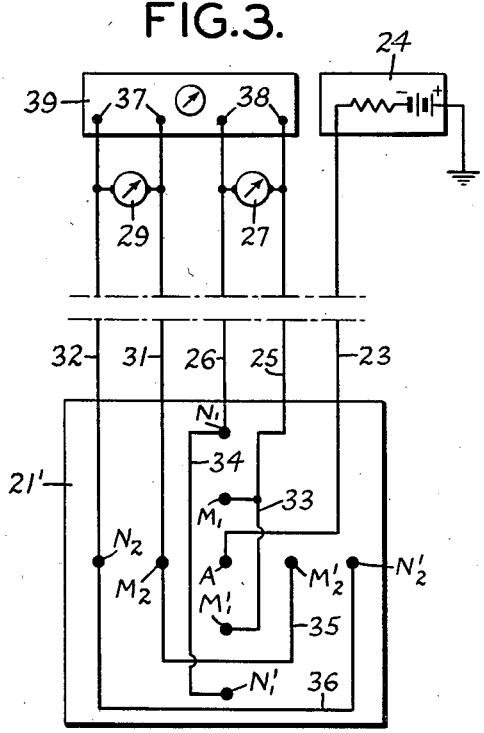
Fig. 3 is a schematic diagram of a modification utilizing symmetrical electrode systems.

In Fig. 3 there is shown an electrical logging system similar to that of Fig. 2 but with symmetrical electrodes $M_1'$, $N_1'$ and $M_2'$, $N_2'$ added to the vertical and horizontal arrays, respectively. These electrodes are connected or short-circuited to the corresponding electrodes $M_1$, $N_1$ and $M_2$, $N_2$ by conductors 33, 34, 35 and 36, respectively.

It has been found that when the additional electrodes $M_1'$, $N_1'$, $M_2'$, $N_2'$ are connected in parallel with the original electrodes as shown, a better averaging effect is obtained should the degree of contact of the pad 21' with the wall vary as the pad is moved through the borehole. It should also be noted that this construction permits symmetry between the electrodes and the edges of the pad 21', thus eliminating any inequality in the horizontal and vertical resistivity measurements, which may result from unequal spacing between respective horizontal and vertical electrodes and the periphery of the pad 21'. It is, of course, possible to make the pad 21' circular, rather than square, thereby maintaining the preferred symmetry. However, other types of pads, such as a portion of the surface of a balloon which can be inflated to urge the electrodes against the borehole wall, as shown in applicant's copending application Serial No. 588,228, filed April 13, 1945, and entitled Method and Apparatus for Determining Formation Factors, for example, would be satisfactory.

From the terminals of the recording instruments 27 and 29 of Fig. 3, respectively, conductors are connected to input terminals 37 and 38 of a ratio meter 39 which indicates the ratio of the resistivities measured. Thus a direct reading of the anisotropy coefficient, given by the apparent horizontal resistivity divided by the apparent vertical resistivity, is afforded. This coefficient may be recorded as a single curve if desired.

Figure 3A:
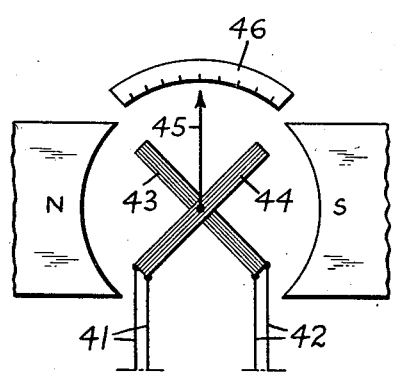
Fig. 3A shows one form of ratio meter useful as an indicator for the various electrode systems.

Fig. 3A shows one form of ratio meter which may be used with any of the embodiments illustrated. Potential differences between the electrodes $N_2$, $M_2$ and $N_1$, $M_1$ are applied to the two pairs of terminals 41 and 42, respectively, which in turn connect to two coils 43 and 44 having longitudinal axes disposed perpendicularly to one another. The coils 43 and 44 are arranged to swing or rotate as a unit about an axis perpendicular to their longitudinal axes at their point of intersection. A pointer 45 is carried on the axis of rotation and is arranged to indicate against a scale 46. Disposed on opposite sides of the coil system are the north and south poles, N and S, respectively, of a permanent magnet.

When equal currents flow in coils 43 and 44, the pointer 45 remains in a neutral position. When the current in one coil exceeds that of another, the different intensity of the magnetic field created thereby will cause the coil system to rotate to a position of stability. The scale 46 can be calibrated to indicate the ratio of the currents in the coils 43 and 44. A ratio meter of this type is shown in Fig. 2 of applicant's U. S. Patent No. 2,249,751 issued July 22, 1941.

Figure 4:
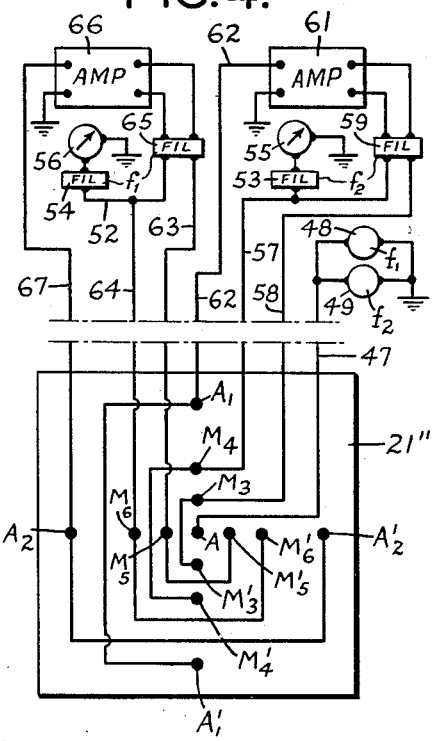
Fig. 4 is a schematic diagram of a modification of the apparatus of Fig. 3 with additional focussing electrodes.

Fig. 4 illustrates a further modification and refinement to the system of Fig. 3, taking advantage of apparatus described in the above-mentioned copending application Serial No. 214,273. As shown in Fig. 4, a pad 21″ mounts an array of electrodes symmetrically positioned about the current emitting electrode A. Measuring electrodes $M_3$ and $M_3'$ are connected together and spaced equally above and below the electrode A. Measuring electrodes $M_5$ and $M_5'$ correspond in the horizontal dimension to the electrodes $M_3$ and $M_3'$ and are spaced an equal distance on either side of the electrode A. Beyond the electrodes $M_3$ and $M_3'$ are positioned short-circuited electrodes $M_4$ and $M_4'$, respectively, and short-circuited electrodes $M_6$ and $M_6'$ bear corresponding spatial relationship to the electrodes $M_5$ and $M_5'$. Pairs of current emitting electrodes $A_1$ and $A_1'$ and $A_2$ and $A_2'$ are located at the ends of the vertical and horizontal lines, respectively, of the electrodes.

The electrode A is connected by a conductor 47 to alternating current sources 48 and 49, which supply currents of frequencies $f_1$ and $f_2$, respectively. The vertical electrodes $M_4$ and $M_4'$ and horizontal electrodes $M_6$ and $M_6'$ are connected by conductors 57 and 64, respectively, through filters 53 and 54, respectively, to recording instruments 55 and 56, respectively. Filter 53 is designed to transmit the frequency $f_2$ and attenuate the frequency $f_1$ while filter 54 is designed to pass the frequency $f_1$ and reject the frequency $f_2$. The instruments 55 and 56 record the vertical and horizontal apparent resistivities in a manner similar to a two-electrode system described previously.

The potential difference between the electrodes $M_4$, $M_4'$ and $M_3$, $M_3'$ is applied over conductors 57 and 58, respectively, through a filter 59, similar to the filter 53, to the input terminals of an amplifier 61. One terminal of the output of the amplifier 61 is connected to ground and the other terminal of the output is connected through a conductor 62 to the pair of vertical short-circuited electrodes $A_1$ and $A_1'$. Conductors 63 and 64 from the horizontal pairs of electrodes $M_5$, $M_5'$ and $M_6$, $M_6'$ connect through a filter 65, similar to the filter 54, to the input terminals of an amplifier 66, similar to amplifier 61. One output terminal of the amplifier 66 is grounded and the other output terminal is connected by a conductor 67 to the pair of horizontal short-circuited electrodes $A_2$ and $A_2'$.

In the operation of the system shown in Fig. 4, apparent resistivity measurements along the vertical and horizontal dimensions of the formations are logged by instruments 55 and 56, respectively, and the anisotropy coefficient determined as before, advantage being taken of the somewhat increased depth of investigation resulting from the electrode systems utilized. An additional depth of penetration and more accurate measurements of only the formations disposed within a limited volume in front of the pad is also achieved. That is to say, the current emanating from electrode A is confined to formations in front of the pad 21″ but will penetrate such formations to a considerable depth. This confining or focussing of the current is effected by means of the additional electrodes $A_1$, $A_1'$ and $A_2$, $A_2'$ in the following manner.

Potential gradients above, below, and on either side of the electrode A due to current emanating therefrom are picked up by the electrodes $M_3$, $M_4$; $M_3'$, $M_4'$; and $M_5$, $M_6$; $M_5'$, $M_6'$, respectively. The potential gradients detected above and below the electrode A are applied to the amplifier 61 through the conductors 57 and 58 and the filter 59. Current is generated in response to these potentials and fed back down the borehole through the conductor 62 to the electrodes $A_1$ and $A_1'$. The amplifier 61 has a gain and phase reversal such that the magnitude and phase of its output current creates counter potential gradients in the formations which substantially annul the original potential gradients detected by $M_3$, $M_4$ and $M_3'$, $M_4'$. Thus the potential gradients above and below electrode A are reduced almost to zero, and substantially no current will flow in these regions. The major portion of the current from the electrode A is, consequently, confined to regions in front of the electrode and tends to pass directly through the mud cake at right angles to the borehole axis as described in the above-mentioned copending application Serial No. 214,273. The resistance offered by any mud cake is thereby effectively reduced.

Similarly, the electrodes $M_5$, $M_6$ and $M_5'$, $M_6'$ respond to potential gradients on either side of the electrode A and cause the amplifier 66 to generate a current such that the electrodes $A_2$, $A_2'$ emit sufficient current to reduce to substantially zero the potential gradients in regions on each side of the electrode A, thereby further confining current from the electrode A to regions in front of the electrode. The two alternating current sources 48 and 49 in cooperation with the filters utilized with this system help to reduce interference between the horizontal and vertical electrodes. Thus, for example, current of the frequency $f_2$ from electrodes $A_1$, $A_1'$ will not adversely affect measurements by the electrodes $M_5$ and $M_6$ since the filters 54 and 65 reject this frequency. It should be understood, of course, that a direct current source could be used with this type of apparatus by employing a commutator arrangement such that the horizontal and vertical electrodes function alternately.

The advantage of the above focussing system is that the anisotropy coefficient is determined for only formations directly in front of the exploring pad and the resistivities of the formations above and below and to each side of the central electrode A are not included appreciably in the measurements. Furthermore, the current is forced through any mud cake and film of drilling liquid and the resistances of such mud cake and liquid do not contribute appreciable errors in the resistivity determinations.

Accordingly, more sensitive measurements indicate the boundaries of relatively thin formation beds, and the anisotropy coefficient for very thin beds may be more accurately determined.

Figure 5:
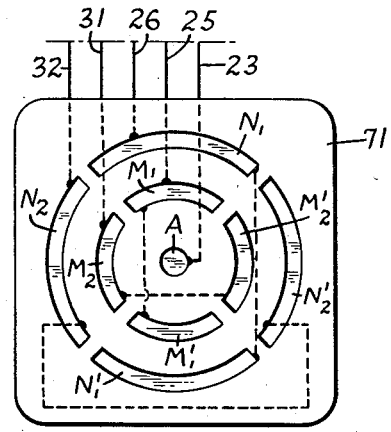
Fig. 5 is a front view of an advantageous electrode design.

Fig. 5 shows a front view of a pad 71 including a desirable electrode construction which may be used with the embodiments of Figs. 3 and 4 for example. However, for purposes of clarity electrodes corresponding to the electrodes $A_1$, $A_1'$ and $A_2$, $A_2'$ have not been shown. The surface of the pad 71 is slightly cylindrically shaped so that it will conform to the borehole wall.

In Fig. 5 the electrodes $M_1$, $N_1$; $M_1'$, $N_1'$; and $M_2$, $N_2$; $M_2'$, $N_2'$ have each an arcuate shape. The corresponding primed and unprimed electrodes are short-circuited, as shown in broken lines, by conductors within the pad 71.

It will be noted that not only is the arcuate length of each measuring electrode substantial, but also the widths of the electrodes in a radial direction are given an appreciable value. This construction not only improves the averaging effect when contact between the pad 71 and the borehole wall is not perfect, but also reduces the contact resistance between the electrodes and adjacent formations.

With the electrode construction shown in Fig. 5 there will ordinarily be five conductors, 23, 25, 26, 31 and 32 leading up through a cable (not shown) to the current source and the recording instruments. If desired, a set of relays may be provided for connecting the conductors 25, 26, 31 and 32 together in different combinations. For example, when the conductors are connected as illustrated schematically in Fig. 3, the electrode system of Fig. 5 may be used to measure the anisotropy coefficient. On the other hand, if it is desired to obtain only the usual resistivity curves, the electrodes $N_1$, $N_2$, $N_1'$ and $N_2'$ can all be connected together by connecting conductors 31 and 32 together, thereby forming effectively a single circular electrode. Similarly, conductors 25 and 26 can be connected together, thus shorting segmental electrodes M₁, M₂, M₁' and M₂', to form effectively another circular electrode. These two circular electrodes and the current emitting electrode A can thus be used as the usual three-electrode system or two-electrode system, with the advantage that a very low contact resistance is realizable because of the large electrode contact area afforded by the circular construction.

In practice the present invention finds use, for example, in distinguishing between conductive shales and permeable beds covered with a conductive mud cake when the salinity of the mud is about equal to the salinity of the connate water in the formations. In such formations the anisotropy coefficient of the conductive shales is different from the anisotropy coefficient of the permeable beds although the apparent vertical resistivity of each may be substantially the same. Measurement of the anisotropy coefficient thus serves to characterize the geological formations and to distinguish more readily boundary lines heretofore difficult to discern.

As another example, extended shale sections often exhibit an anisotropy coefficient which varies materially in different levels while the vertical resistivity of such shale sections may vary only a small amount or be substantially constant. Measurement of the anisotropy coefficient along such sections will thus provide an additional curve from which different levels may be more readily ascertained. Additionally, the anisotropy coefficient log of such sections facilitates the correlation of different logs of these regions in the event that the vertical resistivity exhibits no appreciable variation.

Since there are many possible combinations of electrodes which fall within the scope of the appended claims, the illustrated embodiments are to be considered as exemplary rather than limiting.

I claim:

1. In electrical logging apparatus for use in a well containing a column of relatively conducting liquid, the combination of means for substantially insulating a portion of the side wall of the well from the liquid contained therein, means for passing electric current through the formations between a first point in electrical communication with said wall portion and a relatively remote reference point, means for obtaining indications of potential difference between a point at a reference potential and a second point in electrical communication with said wall portion and spaced from said first point along one axis, and means for simultaneously obtaining indications of potential difference between a point at a reference potential and a third point in electrical communication with said wall portion and spaced from said first point along a different axis angularly displaced from said one axis, said first, second and third points being insulated from said liquid by said insulating means.

2. In electrical logging apparatus for use in a well containing a column of relatively conducting liquid, the combination of means for substantially insulating a portion of the side wall of the well from the liquid contained therein, means for passing electric current through the formations between a first point in electrical communication with said wall portion and a relatively remote reference point, means for obtaining indications of potential difference between a first pair of points in electrical communication with said wall portion and spaced apart from each other and from said first point along one axis, and means for simultaneously obtaining indications of potential difference between a second pair of points in electrical communication with said wall portion and spaced apart from each other and from said first point along a different axis angularly displaced from said one axis, said first point and said first and second pairs of points being insulated from said liquid by said insulating means.

3. In electrical logging apparatus for use in a well containing a column of relatively conducting liquid, the combination of means for substantially insulating a portion of the side wall of the well from the liquid contained therein, means for passing electric current through the formations between a first point in electrical communication with said wall portion and a relatively remote reference point, and means for obtaining indications of potential difference between a point at a reference potential and a second point in electrical communication with said wall portion and spaced from said first point in a direction at an angle to the longitudinal axis of the apparatus, and means for simultaneously obtaining indications of potential difference between a point at a reference potential and a third point in electrical communication with said wall portion and spaced from said first point in a direction parallel to the longitudinal axis of the apparatus, said first, second and third points being insulated from said liquid by said insulating means.

4. The apparatus defined in claim 2, together with means for simultaneously obtaining indications of potential difference between a point at a reference potential and a point insulated from said liquid by said insulating means and in electrical communication with said wall portion and spaced in one of said directions from said first point.

5. In electrical logging apparatus for use in a well containing a column of relatively conducting liquid, the combination of means for substantially insulating a portion of the side wall of the well from the liquid contained therein, means for passing electric current through the formations between a first point in electrical communication with said wall portion and a relatively remote reference point, and means for obtaining indications of the ratio between a first potential difference between a point at a reference potential and a second point in electrical communication with said wall portion and spaced from said first point along one axis, and a second potential difference between a point at a reference potential and a third point in electrical communication with said wall portion and spaced from said first point along a different axis, said first, second and third points being insulated from said liquid by said insulating means.

6. In electrical logging apparatus for use in a well containing a column of relatively conducting liquid, the combination of means for substantially insulating a portion of the side wall of the well from the liquid contained therein, means for passing electric current through the formations between a first point in electrical communication with said wall portion and a relatively remote reference point, means for obtaining indications of potential difference between a point at a reference potential and a first pair of points in electrical communication with said wall portion and spaced symmetrically about said first point along one axis, and means for simultaneously obtaining indications of potential difference between at least one point at a reference potential and a second pair of points in electrical communication with said wall portion and spaced symmetrically about said first point along a different axis, said first point and said first and second pairs of points being insulated from said liquid by said insulating means.

7. In electrical logging apparatus for use in a well containing a column of relatively conducting liquid, the combination of means for substantially insulating a portion of the side wall of the well from the liquid contained therein, means for passing electric current through the formations between a first point insulated from said liquid by said insulating means and in electrical communication with said wall portion and a relatively remote reference point, means for obtaining indications of potential difference between a first pair of points spaced given distances along one axis on opposite sides of said first point and a second pair of points spaced given greater distances along said one axis on opposite sides of said first point, and means for simultaneously obtaining indications of potential difference between a third pair of points spaced given distances along a different axis on opposite sides of said first point and a fourth pair of points spaced given greater distances along said different axis on opposite sides of said first point, said first, second, third and fourth pairs of points all being insulated from said liquid by said insulating means and in electrical communication with said wall portion of the well.

8. In electrical logging apparatus for use in a well containing a column of relatively conducting liquid, the combination of means for substantially insulating a portion of the side wall of the well from the liquid contained therein, means for passing current of a given characteristic and another current of a separably different characteristic through the formations between a first point in electrical communication with said wall portion and a relatively remote reference point, means for obtaining indications of alternating potential difference of said given characteristic between a point at a reference potential and a second point in electrical communication with said wall portion and spaced from said first point along one axis, and means for simultaneously obtaining indications of potential difference of the same characteristic as said current of separably different characteristic between a point at a reference potential and a third point in electrical communication with said wall portion and spaced from said first point along a different axis, said first, second and third points being insulated from said liquid by said insulating means.

9. In electrical logging apparatus for use in a well containing a column of relatively conducting liquid, the combination of means for substantially insulating a portion of the sidewall of the well from the liquid contained therein, means for passing first alternating current of given frequency and another first current of separably different form through the formations between a first point insulated from said liquid by said insulating means and in electrical communication with said wall portion and a relatively remote reference point, means for obtaining indications of alternating potential difference of said given frequency between a first pair of points insulated from said liquid by said insulating means and in electrical communication with said wall portion and spaced apart from each other and from said first point along one axis, means for passing second alternating current of said given frequency through the formations between a relatively remote reference point and a second point insulated from said liquid by said insulating means and in electrical communication with said borehole portion spaced from said first point and first pair of points along said one axis, means for controlling the magnitude and phase of said second alternating current so as substantially to reduce said potential difference of given frequency to zero, means for obtaining indications of potential difference between a remote reference point and a point insulated from said liquid by said insulating means and in electrical communication with said borehole portion, and spaced from said first point along said one axis, where the potential gradient attributable to said first and second alternating currents is substantially zero, means for simultaneously obtaining indications of potential difference of the same form as said current of separably different form between a pair of points insulated from said liquid by said insulating means and in electrical communication with said wall portion and spaced apart from each other and from said first point along a different axis, means for passing second current of said separably different form through the formations between a relatively remote reference point and a third point insulated from said liquid by said insulating means and in electrical communication with said wall portion and spaced apart from said first point along said different axis, means for controlling the magnitude and polarity of said second current of different form so as to reduce substantially to zero the potential difference of said different form, and means for obtaining indications of potential difference of said different form between a relatively remote reference point and a point insulated from said liquid by said insulating means and in electrical communication with said wall portion, and spaced apart from said first point along a different axis, where the potential difference attributable to said first and second currents of said another form is substantially zero.

10. In well logging apparatus for use in wells containing a column of relatively conducting liquid, the combination of an insulating member adapted to be lowered into a well and conformable to the shape of the wall thereof for insulating a portion of the side wall of said well from the liquid contained therein, means for urging said member against the wall of the well, at least two spaced apart electrodes mounted in a face of said member, at least a third electrode mounted in said face of said member and spaced laterally from a line extending between said two electrodes, a source of electrical energy connected to one of said two spaced apart electrodes and to a relatively remote reference point, and electrical indicating means connected to each of the remaining electrodes and to a reference point each of said electrodes adapted to be insulated from said liquid by said insulating member.

11. The combination defined in claim 10 in which the indicating means comprises a ratiometer connected to each of said remaining electrodes.

12. In well logging apparatus for use in wells containing a column of relatively conducting liquid, the combination of an insulating member adapted to be lowered into a well and conformable to the shape of the wall thereof for insulating a portion of the side wall of said well from the liquid contained therein, means for urging said member against the wall of the well, at least three spaced apart electrodes mounted along one axis in a face of said member, another pair of electrodes mounted along a different axis in said face of said member and spaced laterally from each other and from one of said three electrodes, a source of electrical energy connected to said one electrode and to a relatively remote reference point, and electrical indicating means connected to the other two electrodes of said three and to said pair of electrodes each of said electrodes adapted to be insulated from said liquid by said insulating member.

13. In well logging apparatus for use in wells containing a column of relatively conducting liquid, the combination of an insulating member adapted to be lowered into a well and conformable to the shape of the wall thereof for insulating a portion of the side wall of said well from the liquid contained therein, means for urging said member against the wall of the well, a first electrode mounted in a face of said member, a first pair of electrically connected electrodes mounted in said face of the member and disposed symmetrically along one axis on opposite sides of first electrode, a second pair of electrically connected electrodes mounted in said face of the member and disposed symmetrically along a different axis on opposite sides of first electrode, a source of electrical energy connected to said first electrode and to a relatively remote reference point, and indicating means connected to said first and second pairs of electrodes each of said electrodes adapted to be insulated from said liquid by said insulating member.

14. In well logging apparatus for use in wells containing a column of relatively conducting liquid, the combination of an insulating member adapted to be lowered into a well and conformable to the shape of the wall thereof for insulating a portion of the side wall of said well from the liquid contained therein, means for urging said member against the wall of the well, a first electrode mounted in the face of said member adjacent said wall and insulated from said liquid by said insulating member, first, second and third pairs of electrodes symmetrically disposed about said first electrode along one axis, fourth, fifth and sixth pairs of laterally spaced apart electrodes mounted in said face of the member and symmetrically disposed about said first electrode along a different axis, each of said pairs of electrodes being insulated from said liquid by said insulating member the spacings between the electrodes in each of the pairs in each group being respectively different and the electrodes of each pair being electrically connected, a source of alternating current of given frequency connected to said first electrode and to a relatively remote reference point adapted to be in conductive relation to the well wall, a source of current of separably different form connected to said first electrode and to a relatively remote reference point adapted to be in conductive relation to the well wall, first electrical means responsive to alternating potential difference of said given frequency between said first and second pairs of electrodes for supplying to said third pair of electrodes and to a relatively remote reference point alternating current of said given frequency and of proper phase and magnitude to reduce said potential difference of given frequency substantially to zero, second electrical means responsive to potential difference of the same form as said current of separably different form between said fourth and fifth pairs of electrodes for supplying to said sixth pair of electrodes and to a relatively remote reference point electric current of said different form and of proper magnitude and polarity to reduce said potential difference of different form substantially to zero, first electrical indicating means connected between said second pair of electrodes and a reference point, and second electrical indicating means connected between said fifth pair of electrodes and a reference point.

References Cited in the file of this patent

UNITED STATES PATENTS

| | | |
|---|---|---|
| 2,199,367 | Athy et al. | Apr. 30, 1940 |
| 2,203,729 | Jakosky et al. | June 11, 1940 |
| 2,400,678 | Archie | May 21, 1946 |
| 2,427,950 | Doll | Sept. 23, 1947 |
| 2,428,034 | Nichols et al. | Sept. 30, 1947 |
| 2,552,428 | Hilderbrandt | May 8, 1951 |
| 2,592,125 | Doll | Apr. 8, 1952 |
| 2,655,632 | Murphree | Oct. 13, 1953 |
| 2,669,688 | Doll | Feb. 16, 1954 |
| 2,712,629 | Doll | July 5, 1955 |

FOREIGN PATENTS

| | | |
|---|---|---|
| 643,531 | Great Britain | Sept. 20, 1950 |